March 17, 1970  R. U. MITSUYASU  3,501,039
CONTAINER HANDLING AND TRANSPORTING VEHICLE
Filed Feb. 13, 1968  6 Sheets-Sheet 1

Robert U. Mitsuyasu
INVENTOR.

March 17, 1970 R. U. MITSUYASU 3,501,039
CONTAINER HANDLING AND TRANSPORTING VEHICLE
Filed Feb. 13, 1968 6 Sheets-Sheet 2

Robert U. Mitsuyasu
INVENTOR.

March 17, 1970 R. U. MITSUYASU 3,501,039
CONTAINER HANDLING AND TRANSPORTING VEHICLE
Filed Feb. 13, 1968 6 Sheets-Sheet 4

Robert U. Mitsuyasu
INVENTOR.

BY Clarence A. O'Brien
and Harvey B. Jacobson
Attorneys

United States Patent Office

3,501,039
Patented Mar. 17, 1970

3,501,039
CONTAINER HANDLING AND TRANSPORTING VEHICLE
Robert U. Mitsuyasu 91–710 Makule Road,
Ewa Beach, Oahu, Hawaii 96706
Filed Feb. 13, 1968, Ser. No. 705,131
Int. Cl. B60p *1/02;* B60g *11/14;* B60k *5/00*
U.S. Cl. 214—390                                12 Claims

ABSTRACT OF THE DISCLOSURE

An elongated vehicle including front steerable wheels and rear opposite side wheels, the rear end portion of the vehicle including a pair of rearwardly projecting opposite side portions of the vehicle from which the rear wheels are supported and between which is defined a vertically extending area opening both above and below the vehicle and also rearwardly of the vehicle with the opposite side portions of the vehicle from which the rear wheels are journalled being provided with load engaging and lifting means whereby a load to be lifted and transported may be straddled by the rear end portion of the vehicle, engaged, lifted and then transported to a remote location.

---

The container handling and transporting vehicle of the instant invention has been primarily designed for handling and transporting large containers in which substantially any product may be contained and similar to those containers utilized in containerized freighting operations by the railroads. The vehicle, by being capable of handling and transporting such containers, may be utilized to pick up individual containers at various locations and transport the containers to a central location for placing on railway flat cars or the like. Of course, the vehicle may also be utilized to handle and transport containers from a central location to which they are shipped to the individual areas to which the containers are to be delivered.

The particular configuration of vehicle resulting from the provision of a vehicle including rearwardly projecting opposite side portions between which a container to be transported is carried and which is totally free of any portion of the vehicle results in the usual storage areas in vehicles being eliminated in favor of the provision of the largest possible area in which to receive a container to be handled and transported. Therefore, the vehicle of the instant invention has been constructed in a manner whereby the forward hood portion of the vehicle is slightly higher than usual and the upper portion of the hood area of the vehicle is constructed so as to define a storage area in which various items such as luggage or additional small pieces of freight may be placed. However, inasmuch as the transformation of the upper hood portion of the vehicle into a small storage compartment prevents ready access to the prime mover for the vehicle disposes immediately therebeneath, the prime mover of the container handling and transporting vehicle of the instant invention is mounted within the front portion of the vehicle in a way such that the prime mover may be displaced forwardly to a position extending completely forward of the hood portion of the vehicle so as to provide access for ease in maintenance.

The main object of this invention is to provide a container handling and transporting vehicle which will be capable of positioning itself adjacent a large container, engaging the container, lifting the container and supporting the container while the latter is transported to a remote location.

Another object of this invention is to provide a vehicle in accordance with the preceding object and constructed in a manner whereby it may travel over roadways at reasonably high speeds.

Yet another object of this invention is to provide a vehicle in accordance with the preceding object and constructed in a manner whereby it may be readily operated and driven by substantially any person capable of driving a conventional passenger vehicle.

Another object of this invention is to provide a vehicle in accordance with the preceding objects and including a forwardly disposed prime mover which is shiftable longitudinally of the vehicle to a position projecting forwardly of the front end of the vehicle for ease in servicing.

Another object of this invention is to provide the upper hood portion of the vehicle extending over the prime mover with storage space adapted to receive small articles to be carried.

A final object of this invention to be specifically enumerated herein is to provide a container handling and transporting vehicle which will conform to conventional forms of manufacture, be of simple construction and easy to operate so as to provide a device that will be economically feasible, long lasting and relatively trouble-free to operate.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Referring now more specifically to the drawings, the numeral 10 generally designates the container handling and transporting vehicle. The vehicle 10 includes pairs of opposite side transversely spaced inner and outer upstanding longitudinal members 12 and 14. Each pair of inner and outer members 12 and 14 is interconnected by means of a front steerable wheel assembly generally referred to by the reference numeral 16, a rear drive wheel assembly generally referred to by reference numeral 18, and a plurality of transversely extending support members 20, 22, 24 and 26. Further, a front upstanding and transversely extending panel-like bumper structure 28 is pivotally supported at its opposite end upper corners from the forward upper corners of the outer members 14 as at 30 for swinging movement between the solid and phantom line positions illustrated in FIGURE 5. Also, a rear upstanding and transversely extending gate 32 is pivotally supported at one end from the rear end of the left hand outer member 14 by a removable pivot fastener 34 for swinging movement about a vertical axis and may be secured in the closed position illustrated in FIGURE 2 of the drawings by the utilization of a removable pivot fastener 36 which also serves to pivotally support the gate 32 from the extensions 38 supported at the rear of the right hand outer member 14 when the pivot fastener 34 is removed.

A suitable cab structure generally referred to by the reference numeral 40 is supported over the upper edge portions of the forward ends of the members 12 and 14. The cab structure 40 includes a front hood assembly 42 and a driver and passenger enclosure generally referred to by the reference numeral 44 which is conventional in design and includes opposite side pivoted doors 46, a seat (not shown) for a driver and a passenger and suitable operating controls for the vehicle 10 such as the steering wheel 48.

Figure 2:
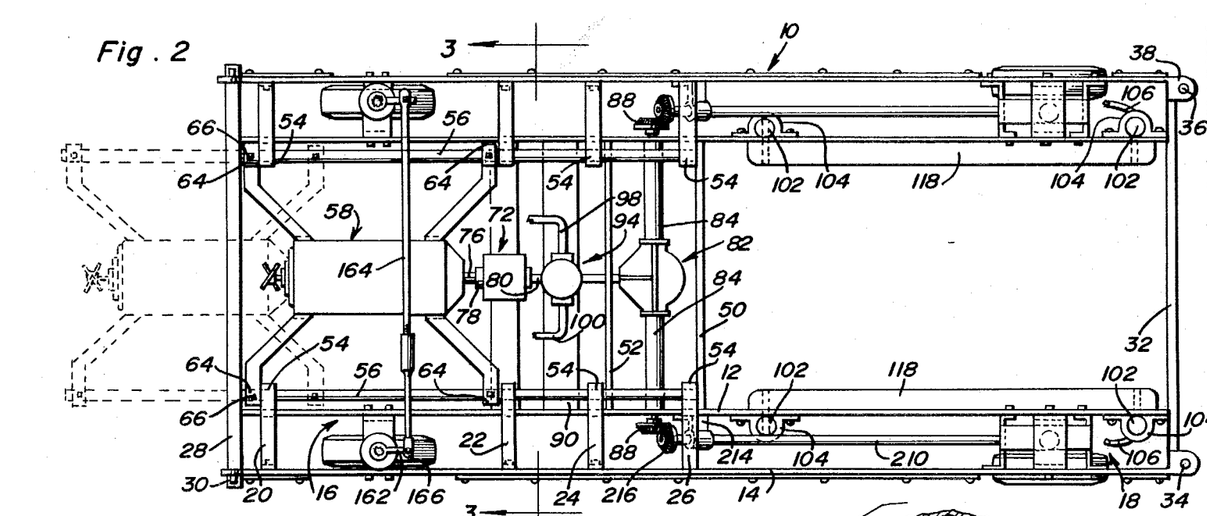
FIGURE 2 is a top plan view of the vehicle with an alternate forwardly projecting position of the prime mover of the vehicle illustrated in phantom lines.
Figure 3:
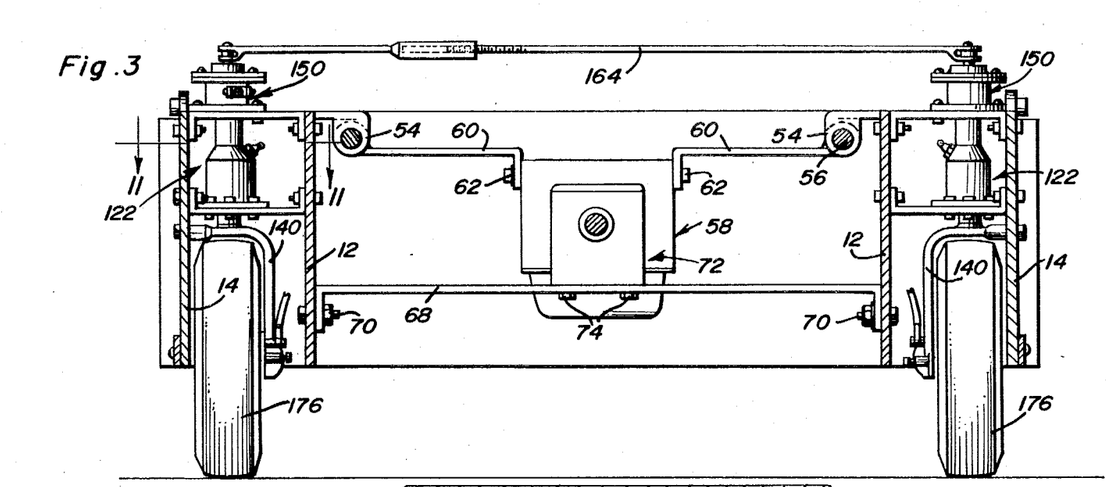
FIGURE 3 is an enlarged fragmentary transverse vertical sectional view taken substantially upon a plane indicated by the section line 3—3 of FIGURE 2.

The inner members 12 are interconnected by means of a pair of transversely extending upstanding plates 50 and 52 and the transverse support members 20, 22, 24 and 26 each project inwardly of the corresponding inner member 12 and define journal portions 54, see FIGURE 3. The journal portions 54 on each side of the vehicle 10 are aligned and slidably received therethrough a support bar 56. The vehicle 10 includes a prime mover referred to in general by the reference numeral 58 and which is supported from bars 56 by means of suitable motor mounting arms 60 secured to the prime mover 58 in any convenient manner such as by fasteners 62 and including sleeve portions 64 through which the bars 56 are received. The sleeve portions 64 include setscrews 66 whereby the motor mounting arms 60 are secured in position on the bars 56. However, inasmuch as the bars 56 are slidable through the sleeve portions 54, the entire prime mover and its motor supporting arms 60 may be shifted from the solid line positions thereof illustrated in FIGURE 2 of the drawings to the phantom line position illustrated in FIGURE 2. Of course, the sleeves portions 64 carried by the rear arms 60 are engageable by the sleeve portions 54 carried by the front members 20 and accordingly, forward displacement of the prime mover 58 is limited.

A transverse brace 68 is secured between the inner members 12 in any convenient manner such as by fasteners 70 and a transmission generally referred to by reference numeral 72 is supported from the transverse brace 68 centrally intermediate its opposite ends by means of suitable fasteners 74. The prime mover 58 includes an output shaft 76 which is axially disengageable with the input shaft portion 78 of the transmission 72 and the transmission 72 includes an output shaft 80 extending into a differential assembly generally referred to by the reference numeral 82 and supported between the transverse members 50 and 52, the shaft 80 extending through the transverse member 52. The differential assembly 82 includes a pair of half axle housings 84 through which half shafts 86 extend and the remote ends of the half shafts 86 have bevel gears 88 mounted thereon for rotation therewith.

A second transverse brace 90 is secured between the inner members 12 by means of suitable fasteners 92 and a fluid pump generally referred to by reference numeral 94 is supported from the transverse member 90 centrally intermediate its opposite ends by means of fasteners 96 similar to fasteners 74. The drive or output shaft 80 extends through the fluid or hydraulic pump 94 and therefore powers the latter. The hydraulic pump 94 includes an output line 98 which extends forward to any suitable controls (not shown) disposed in the enclosure assembly 44 and a return line 100 which extends rearwardly from the aforementioned controls to the hydraulic pump 94. Two pairs of opposite side front and rear hydraulic cylinders 102 are supported on the outer sides of the inner members 12 by means of suitable mounting brackets 104 and hydraulic lines 106 and 108 extend from the hydraulic cylinders 102 to the aforementioned controls whereby the latter may be actuated to extend and retract the hydraulic cylinders 102.

The hydraulic cylinders or fluid motors 102 include cylinder portions 110 which are stationarily supported from the inner members 12 by means of the brackets 104 and extendable and retractable piston rod portions 114 which each include an inwardly projecting arm 116. The inwardly projecting arms 116 carried by the piston rod portions 114 on each side of the vehicle 10 are interconnected by means of a longitudinally extending shelf member 118 and each of the shelf members 118 may be disposed beneath the corresponding side of a large container 120 positioned between the inner members 12. Thereafter, the hydraulic cylinders 102 may be actuated to retract the piston rod portions 114 and to thereby lift the container 120 and support the latter for transit by the vehicle 10.

Figure 1:
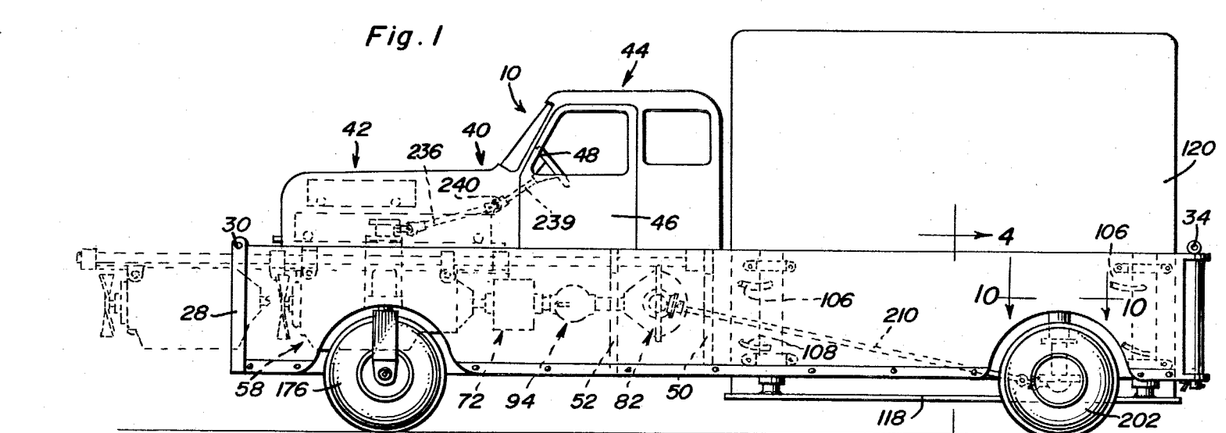
FIGURE 1 is a side elevational view of the vehicle of the instant invention.
Figure 5:
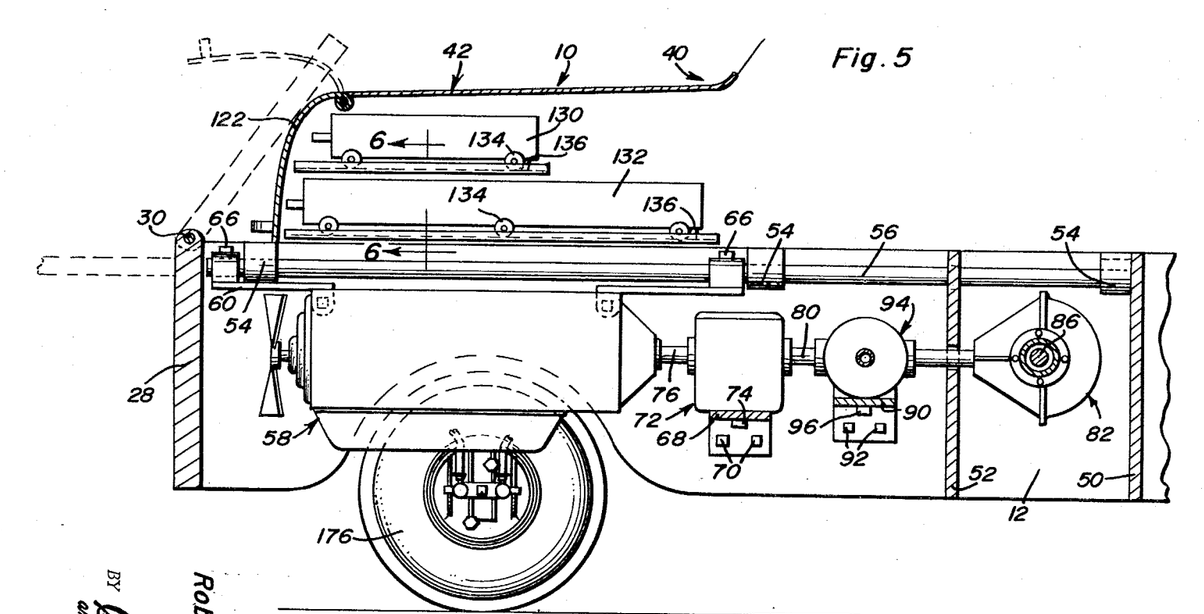
FIGURE 5 is an enlarged fragmentary longitudinal vertical sectional view of the forward portion of the vehicle taken substantially upon a plane passing through the longitudinal center line of the vehicle.
Figure 6:
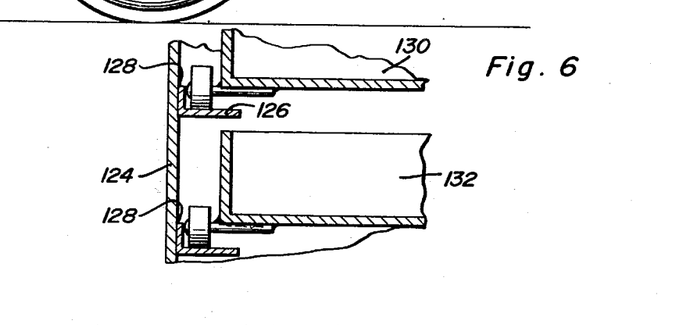
FIGURE 6 is an enlarged fragmentary transverse vertical sectional view taken substantially upon a plane indicated by section line 6—6 of FIGURE 5.

With attention now invited more specifically to FIGURES 1 and 5 of the drawings it may be seen that the hood assembly 42 projects a considerable distance upwardly over the prime mover 58 and that the forward end of the hood assembly 42 includes a hinged closure 122 which may be swung from the closed position illustrated in solid lines in FIGURE 5 of the drawings to the open position illustrated in phantom lines in FIGURE 5. Thus, the hood assembly 42 defines a forwardly opening compartment which is closable by means of the closure member 122 and the hood assembly includes a pair of opposite side wall portions 124 from which horizontally aligned vertically spaced pairs of opposite side angle members 126 are supported in any convenient manner such as by welding 128.

A pair of upper and lower containers 130 and 132 are provided and include opposite side supporting rollers 134 rollingly supported from the corresponding angle members 126. Thus, the containers 130 and 132 may be forwardly withdrawn to the open forward end of the hood assembly 42 after the closure member 122 has been swung toward the open position. The containers 130 and 132 are readily removable from the angle members 126 and the latter include rear end upwardly projecting abutments 136 for limiting rearward movement of the containers 130 and 132 within the hood assembly 42.

Figure 7:
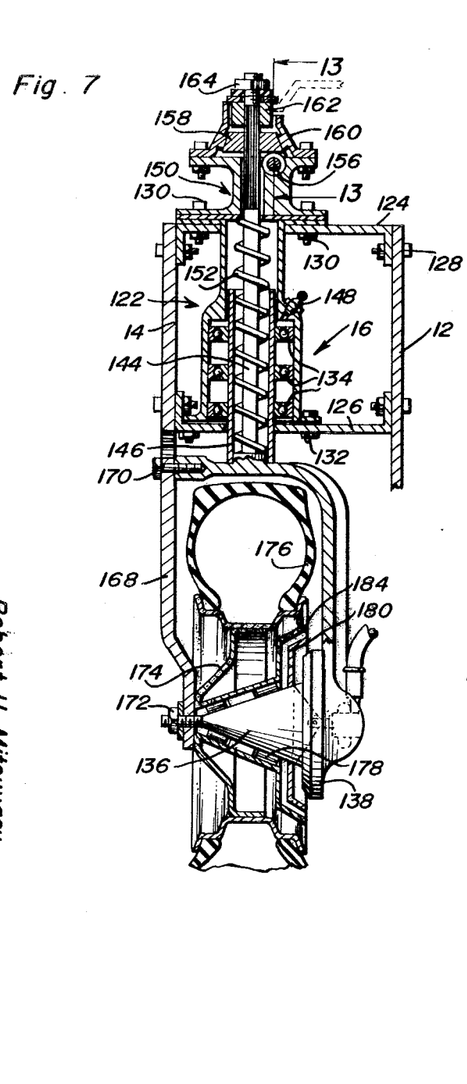
FIGURE 7 is a fragmentary enlarged vertical sectional view taken substantially upon a plane passing through the center of one of the front steerable wheel assemblies.
Figure 8:
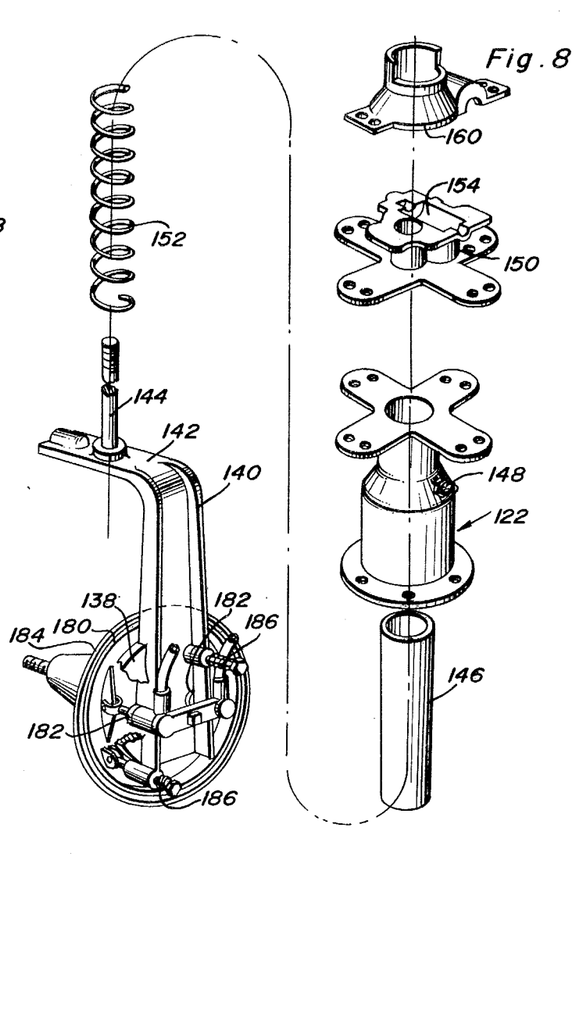
FIGURE 8 is a fragmentary exploded perspective view of the assemblage illustrated in FIGURE 7 with some of the portions thereof omitted.

Referring now more specifically to FIGURES 3, 7 and 8 of the drawings it may be seen that each of the front wheel assemblies 16 includes a tubular journal bearing housing referred to in general by the reference numeral 122 secured between a pair of upper and lower plates 124 and 126 secured between the corresponding inner and outer members 12 and 14 in any convenient manner such as by fasteners 128. The journal bearing housing 122 is supported from the plates 124 and 126 by means of fasteners 130 and 132 and the lower end of the journal bearing housing 122 is diametrically enlarged and houses a plurality of vertically spaced journal bearings 134. Each steerable front wheel assembly 16 further includes a conical spindle portion 136 supported from a backing plate 138. Each backing plate includes an inverted L-shaped support arm from which the backing plate 138 is secured and each L-shaped support arm 140 includes a short horizontally disposed upper leg 142 from whose central portion an upwardly projecting shaft 144 extends.

Each of the upper legs 142 also includes an upwardly projecting sleeve 146 which extends about a corresponding shaft 144 and which is snugly telescopingly received in the diametrically reduced upper end of the corresponding journal bearing housing 122. The outer surfaces of the sleeve 146 are snugly received through the journal bearings 134 and the housing 122 includes a grease fitting 148 by which lubricating material may be forced into the housing 122.

Each front wheel supporting structure 16 further includes a tubular upper housing referred to in general by the reference numeral 150 secured to the corresponding upper plate by means of the fasteners 130 and through which the splined upper end of the shaft 144 extends. A compression spring 152 is disposed about the lower end portion of the shaft 144 and is positioned between the upper leg 142 and the lower end of the upper housing 150 and therefore it yieldingly urges the lower leg 142 downwardly.

The upper housing 150 includes a journal recess 154 in which a worm gear 156 is journalled and a worm wheel 158 is mounted on the splined upper end of the shaft 144 with which the worm gear 156 is meshed. Each of the shafts 144 projects upwardly through a removable top portion 160 of the corresponding upper housing 150 and has a steering arm 162 secured thereto by means of a suitable fastener 164. The steering arms 162 are interconnected by means of an adjustable length connecting bar 164 pivotally secured at its opposite end to the free ends of the support arms 162 as at 166.

A removable support leg 168 which is vertically disposed is interconnected between the free end of each upper leg 142 and the free end of the corresponding spindle 136 by means of suitable fasteners 170 and 172, the support leg 168 and fastener 172 also serving to maintain wheel 174 journalled on the spindle 136. Each wheel 174 is provided with a pneumatic tire 176 and is journalled from the corresponding spindle portion 136 by means of suitable roller bearings 178.

Figure 13:
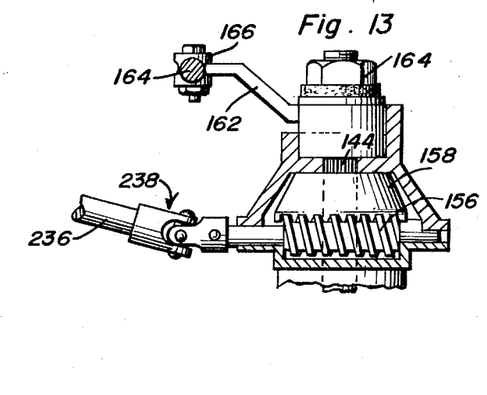
FIGURE 13 is an enlarged fragmentary vertical sectional view taken substantially upon the plane indicated by the section line 13—13 of FIGURE 7.

Finally, each steerable front wheel assembly 16 includes a horizontally shiftable frusto-conical brake shoe 180 which is supported from the corresponding backing plate 138 by means of hydraulic cylinders 182. The wheels 174 each include an integral frusto-conical brake drum 184 with which the associated brake shoe 180 is engageable upon actuation of the hydraulic cylinders 182. Of course, the hydraulic cylinders 182 may be suitably actuated by any conventional hydraulic braking system (not shown). Also, a pair of compression springs 186 are operatively connected between each brake shoe 180 and the corresponding backing plate 138 for returning the brake shoe 180 to its rest position after being engaged with the corresponding brake drum 184.

With reference now more specifically to FIGURES 9–12 and 14, it may be observed that each rear drive wheel assembly 18 includes a depending support sleeve 190 supported from the mid-portion of the transverse brace 192 secured between the corresponding inner and outer members 12 and 14 and a transverse axle 193 journalled through the lower end of an upstanding tubular housing 194 whose upper end is snugly telescopingly received in the lower end of the support sleeve. Each support sleeve 190 is generally rectangular in cross-sectional shape and includes a plurality of rollers 196 journalled from each side thereof at points spaced longitudinally therealong. The rollers 196 project slightly through openings 198 provided therefor in the walls of the support sleeve 190 and are disposed in rolling engagement with the corresponding outer surface portion of the associated tubular housing 194, the latter also being generally rectangular in configuration.

Figures 9, 10, 12:
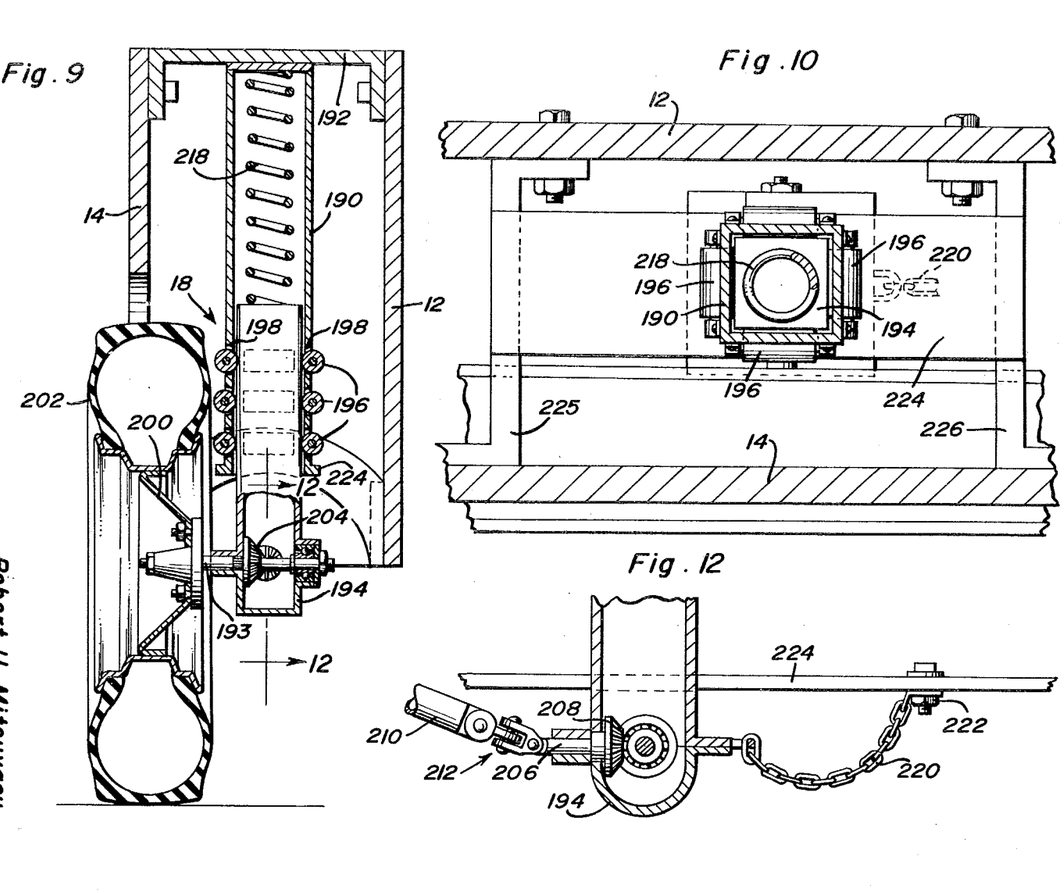
FIGURE 9 is a fragmentary enlarged transverse vertical sectional view taken substantially upon a plane passing through the center of one of the rear driving wheel support structures.
FIGURE 10 is an enlarged fragmentary horizontal sectional view taken substantially upon a plane indicated by the section line 10—10 of FIGURE 1.
FIGURE 12 is an enlarged fragmentary vertical sectional view taken substantially upon the plane indicated by the section line 12—12 of FIGURE 9.
Figure 11:
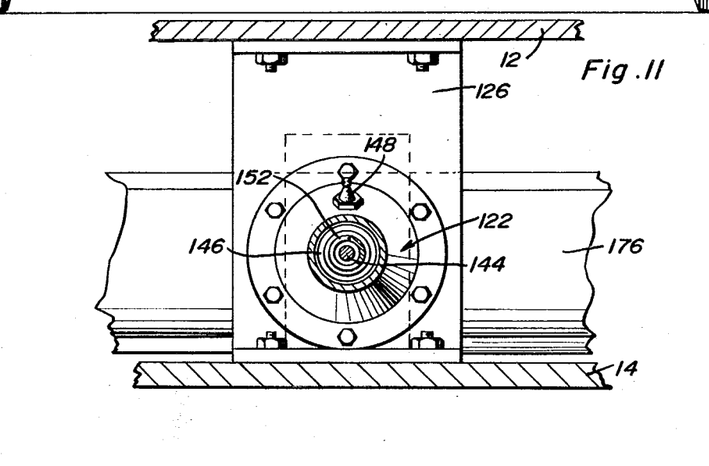
FIGURE 11 is an enlarged fragmentary horizontal sectional view taken substantially upon the plane indicated by section line 11—11 of FIGURE 3.

A rear drive wheel 200 including a pneumatic tire 202 is mounted on each axle 193 for rotation therewith and a bevel gear 204 is mounted on each axle 193 within the corresponding tubular housing 94.

An input shaft 206 is journalled through a forward portion of the lower end of each tubular housing 194 and includes a bevel gear 204. The forward end of each input shaft 206 is connected to a corresponding rearwardly and downwardly inclined drive shaft 210 by means of a suitable universal joint assembly generally referred to by reference numeral 212 and the forward upper end of each driveshaft 210 is journalled through a suitable journal bracket 214 supported from the corresponding inner member 12, see FIGURE 2. The forward extremity of each driveshaft 210 has a bevel gear 216 mounted thereon which is meshed with the corresponding bevel gear 88 and therefore the output shaft of the prime mover 58 may be drivingly coupled to the wheels 200 through the transmission 72, the differential assembly 82 and the driveshafts 210.

A compression spring 218 is disposed in each tubular support sleeve 190 between the upper end thereof and the upper end of the associated tubular housing 194 and therefore yieldingly urges the tubular housings 194 downwardly. A length of flexible chain 220 is connected between the lower end of each tubular housing 194 and a suitable anchor 222 carried by a longitudinal brace member 224 extending between a pair of associated transverse brace members 225 and 226 secured between the inner and outer members 12 and 14 through which the lower end of the tubular housing 194 is slidably received. The chains limit downward displacement of the housing 194 relative to the support sleeves. Further, the lower end of each support sleeve 190 is secured to the corresponding brace member 224, see FIGURE 9 and therefore the tubular support sleeves 190 are supported at their upper and lower ends.

Figure 14:
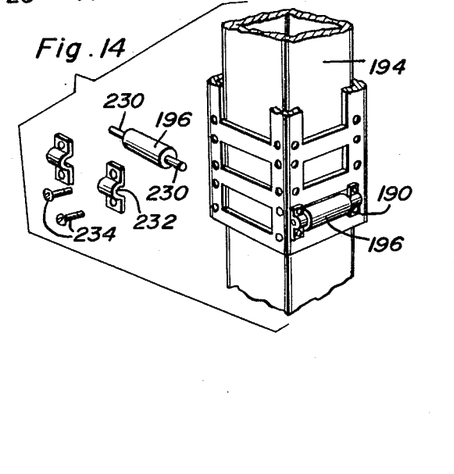
FIGURE 14 is an exploded fragmentary perspective view of one of the guide structures of the rear driving wheel support assemblies.

With attention now invited more specifically to FIGURE 14, it may be seen that the rollers 196 include diametrically reduced stub axle end portions 230 and that these stub axle end portions are journalled from the tubular support 190 by means of suitable journal brackets 232 removably secured to the outer surfaces of the tubular support 190 by means of suitable fasteners 234.

The worm gear 156 and worm wheel 158 are provided on only one of the front wheel assemblies 16 and omitted from the other and the worm gear 156 is driven by a drive shaft 236 coupled thereto by means of a universal joint assembly 238 and which is in turn coupled to the steering wheel shaft 239 by means of a universal joint assembly 240, see FIGURE 1. Accordingly, both of the front wheel assemblies may be steered by means of the steering wheel 48 and the effective length of the connecting bar 164 may be adjusted whereby the front wheels 174 may be adjusted for proper toe-in and toe-out.

Either removable pivot fastener may be removed to release the corresponding end of the rear gate 32 for swinging movement and therefore the rear gate 32 may be selectively opened to either side of the vehicle 10. In addition, inasmuch as both of the pivot fasteners for the rear gate 32 are removable, the rear gate 32 may be completely removed.

Figure 4:
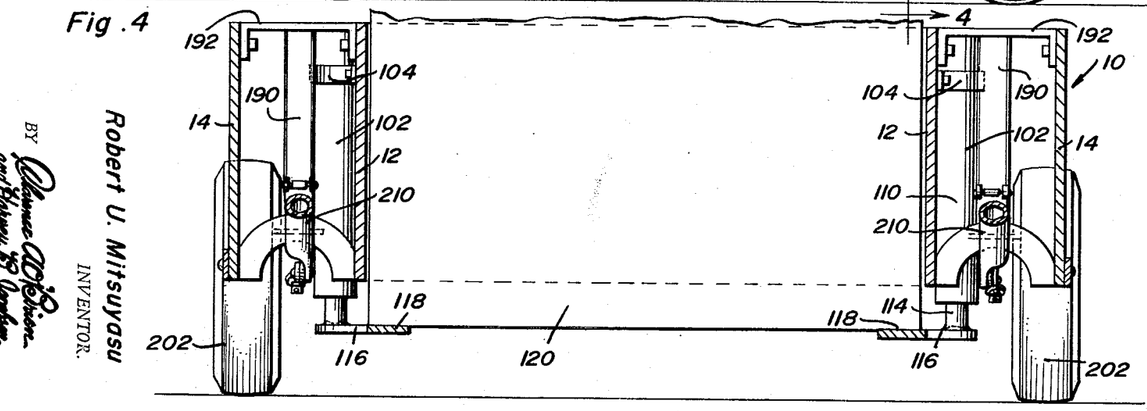
FIGURE 4 is an enlarged fragmentary transverse vertical sectional view taken substantially upon a plane indicated by section line 4—4 of FIGURE 1.

In operation, the container 120 to be picked up and transported may be conveniently supported in a slightly elevated position with its opposite side bottom edge portions projecting outwardly of the means by which the container 120 is supported in elevated position. Then, the vehicle 10 may be backed so that the container 120 is embraced between the inner side members 12 after the piston rod portions 114 have been lowered so that the members 118 will pass beneath the opposite side bottom surfaces of the container 120. Then, when the vehicle 10 has been properly positioned relative to the container 120, the hydraulic cylinders 102 may be actuated to raise the piston rod portions 114 and to thus lift the container 120 to the position thereof illustrated in FIGURES 1 and 4 of the drawings. Thereafter, the vehicle 10 may proceed to a remote location before lowering the container onto a suitable support therefor after which the vehicle 10 may be advanced forwardly away from the container 120.

Suitable freight, tools or luggage or any other desired materials may be also transported within the containers 130 and 132 and access may be had to the prime mover 58 for its replacement or for maintenance to be performed hereon merely by swinging the upper structure 28 to the phantom line position illustrated in FIGURE 5 of the drawings and then forwardly displacing the prime mover 58 from the position thereof illustrated in FIGURE 5 of the drawings to the dotted line position thereof illustrated in FIGURES 1 and 2 of the drawings. Of course, it is to be understood that any suitable means (not shown) may be utilized to retain the prime mover 58 in its rearwardmost position operatively coupled with the transmission input shaft 78.

The vehicle 10, if desired, may include upstanding transversely extending inverted U-shaped support members spaced longitudinally of the longitudinal members 12 and 14 and having the lower end portion of their leg portions secured between corresponding longitudinal members 12 and 14. These U-shaped support members may have the upper center portions therof interconnected by means of any suitable brace member extending longitudinally of the vehicle and may be utilized to support a flexible cover of the rear end of the vehicle 10 as well as form a bracing structure between the rear end portions of the opposite sides of the vehicle 10. Also, the pivotally mounted and removable rear gate 32 may be replaced by a pair of transversely extending upper and lower gate bars pivotally secured at one pair of remote end portions to the corresponding sides of the vehicle 10 for swinging movement about both vertical and horizontal axes and including means at the other pair of remote ends thereof adapted for releasable securement to the far sides of the vehicle.

The forwardly opening compartment beneath the hook assembly 42 may be eliminated if desired so as to provide better vision of the roadway immediately in front of the vehicle 10 and a suitable shock absorber (not shown) may be readily operatively associated with the front compression springs 152. Further, the rear chains 122 may be eliminated and suitable tubular shock absorber assemblies may be connected between the upper ends of the tubular housings 94 and the upper end walls of the tubular sleeves 190 to act in conjunction with the springs 218.

Finally, the hydraulic pump 94 could be readily disposed on the right or left hand sides of the transmission 72 and driven from any suitable laterally extending output shaft of the transmission 72. If the pump 94 is placed on either side of the transmission 72, the output shaft 80 may then extend directly to the differential assembly 82.

The foregoing is considered as illustrative only of the principles of the invention. Further, since numerous modifications and change will readily occur to those skilled in the art, it is not desired to limit the invention to the exact construction and operation shown and described, and accordingly all suitable modifications and equivalents may be resorted to falling within the scope of the invention.

What is claimed as new is as follows:

1. A vehicle for transporting large loads, said vehicle including transversely spaced apart rearwardly projecting opposite side portions defining an area therebetween open at its top and bottom and adapted to receive large loads therein and also opening rearwardly of said vehicle, said vehicle including front support means adapted to be supported from the ground for movement thereover as well as rear supporting wheel means supported from each of said rearwardly projecting opposite side portions, and load engaging and lifting means carried by each of said rearwardly projecting opposite side portions and operable to engage and lift a load disposed between said rearwardly projecting opposite side portions, said front support means including opposite side front steerable wheel means, said rear supporting wheel means including ground engaging drive wheel means, a prime mover supported from said vehicle forward of the forwardmost extremity of said area and drivingly connected to the drive wheel means on each side of said vehicle, said vehicle including a driver's cab portion disposed forwardly of said area and a front hood portion disposed forwardly of said cab portion, said prime mover being disposed beneath the uppermost area enclosed by said hood portion, said uppermost area defining a covered storage area, and means supporting said prime mover from said vehicle for shifting longitudinally of said vehicle between a first operative position disposed beneath said storage area and a second position displaced at least substantially fully forwardly of said front hood portion for ease in performing repair operations on said prime mover.

2. The combination of claim 1 wherein said hood portion includes a closure for the forward end of said storage area shiftable into and out of position closing said storage area.

3. The combination of claim 2 including container means dsiposed in said storage area and supported for shifting longitudinally of said vehicle through the open forward end portion of said area when said closure is out of position closing said storage area.

4. The combination of claim 1 wherein said rearwardly projecting opposite side portions each include longitudinally spaced powered lifting means each adapted to support and lift a corresponding portion of the weight of said load.

5. The combination of claim 4 wherein said powered lifting means include arm portions projecting transversely into said area and supported at their outer ends by means of extendable portions of upstanding hydraulic cylinders supported from said rearwardly projecting opposite side portions.

6. A vehicle for transporting large loads, said vehicle including transversely spaced apart rearwardly projecting opposite side portions defining an area therebetween open at its top and bottom and adapted to receive large loads therein and also opening rearwardly of said vehicle, said vehicle including front support means adapted to be supported from the ground for movement thereover as well as rear supporting wheel means supported from each of said rearwardly projecting opposite side portions, and load engaging and lifting means carried by each of said rearwardly projecting opposite side portions and operable to engage and lift a load disposed between said rearwardly projecting opposite side portions, said front support means including opposite side front steerable wheel means, a prime mover supported from said vehicle forward of the forwardmost extremity of said area and drivingly connected to the drive wheel means on each side of said vehicle, said vehicle including a driver's cab portion disposed forwardly of said area and a front hood portion disposed forwardly of said cab portion, said prime mover being disposed beneath the uppermost area enclosed by said hood portion, said uppermost area defining a covered storage area, means supporting said prime mover from said vehicle for shifting longitudinally of said vehicle between a first operative position disposed beneath said storage area and a second position displaced at least substantially fully forwardly of said front hood portion for ease in performing repair operations on said prime mover, said front steerable wheel means being disposed forward of the rear end of said prime mover when the latter is in said first position, means interconnecting said steerable wheel means for simultaneous steering movement, said wheel means being journalled from the lower end portions of upstanding steerable support structure therefor dependingly supported from their upper end portions, said means interconnecting said wheel means comprising linkage means connected between said upper end portions and extending over said prime mover.

7. The combination of claim 6 wherein said linkage means extends transversely of said vehicle beneath said storage area.

8. A vehicle for transporting large loads, said vehicle including transversely spaced apart rearwardly projecting opposite side portions defining an area therebetween open at its top and bottom and adapted to receive large loads therein and also opening rearwardly of said vehicle, said vehicle including front support means adapted to be supported from the ground for movement thereover as well as rear supporting wheel means supported from each of said rearwardly projecting opposite side portions, and load engaging and lifting means carried by each of said rearwardly projecting opposite side portions and operable to engage and lift a load disposed between said rearwardly projecting opposite side portions, said front support means including front supporting wheel means, a suspension assembly for one of said wheel means, said suspension assembly including an upstanding tubular member supported at its upper and lower end portions from a suitable supporting portion of said vehicle, an upstanding sleeve member having its upper end portion slidingly and telescopingly engaged with the lower end portion of said tubular member, said one wheel means comprising a wheel journalled from the lower end portion of said sleeve member, and upstanding compression spring means disposed within said tubular member with its upper end acting upon said tubular member and its lower end acting upon said sleeve, the lower end portion of said sleeve member including an inverter L-shaped support arm whose upper short leg is secured adjacent its midpoint to the lower end of said sleeve, a spindle portion projecting horizontally outwardly from the lower end of the upstanding long leg of the support arm and disposed beneath and generally paralleling said short leg, said one wheel being journalled on said spindle portion and removable from the outer end thereof, and an upstanding support leg having its lower end removably secured to the outer end of said spindle and its upper end removably secured to the end of said short leg remote from said long leg.

9. The combination of claim 8 wherein said tubular member and sleeve are cylindrical.

10. The combination of claim 8 wherein said tubular mmeber and sleeve are of complementary non-circular cross-sectional shape.

11. The combination of claim 8 wherein said ground engaging wheel comprises a drive wheel, and shaft means drivingly connected to said drive wheel and adapted to be driven from a suitable motive source.

12. The combination of claim 8 including steering control means connected between said sleeve member and said tubular member operative to rotate said sleeve member relative to said tubular member.

References Cited

UNITED STATES PATENTS

| | | | |
|---|---|---|---|
| 1,480,257 | 1/1924 | Gerlinger | 214—392 |
| 1,893,609 | 1/1933 | Austin. | |
| 2,035,212 | 3/1936 | Alborn. | |
| 2,336,386 | 12/1943 | Beck | 214—83.36 |
| 2,430,759 | 11/1947 | Crise | 180—69 |
| 2,547,269 | 4/1951 | Kinsey | 214—390 |
| 2,862,635 | 12/1958 | Christenson et al. | 214—392 |
| 3,018,905 | 1/1962 | Trump | 214—390 |
| 3,024,931 | 3/1962 | Grover et al. | 214—390 |
| 3,053,404 | 9/1962 | Beck et al. | 214—83.36 |
| 3,173,670 | 3/1965 | Hornsby | 267—60 |
| 3,300,071 | 1/1967 | Isaacs | 214—390 |

ALBERT J. MAKAY, Primary Examiner

U.S. Cl. X.R.

180—64; 267—60